US011820389B2

(12) United States Patent
Austrheim et al.

(10) Patent No.: US 11,820,389 B2
(45) Date of Patent: Nov. 21, 2023

(54) CONTAINER ACCESSING STATION WITH LIFTING DEVICE

(71) Applicant: Autostore Technology AS, Nedre Vats (NO)

(72) Inventors: Trond Austrheim, Etne (NO); Ragnar Stuhaug, Skjold (NO)

(73) Assignee: Autostore Technology AS, Nedre Vats (NO)

( * ) Notice: Subject to any disclaimer, the term of this patent is extended or adjusted under 35 U.S.C. 154(b) by 459 days.

(21) Appl. No.: 15/734,409

(22) PCT Filed: Jun. 11, 2019

(86) PCT No.: PCT/EP2019/065184
§ 371 (c)(1),
(2) Date: Dec. 2, 2020

(87) PCT Pub. No.: WO2019/238661
PCT Pub. Date: Dec. 19, 2019

(65) Prior Publication Data
US 2021/0163222 A1  Jun. 3, 2021
US 2022/0204261 A2  Jun. 30, 2022

(30) Foreign Application Priority Data

Jun. 12, 2018 (NO) .................................... 20180813
Jul. 19, 2018 (NO) .................................... 20181005

(51) Int. Cl.
*B65G 1/04* (2006.01)
*B65G 1/06* (2006.01)
(Continued)

(52) U.S. Cl.
CPC ......... *B60W 50/0098* (2013.01); *B61B 13/00* (2013.01); *B65G 1/0414* (2013.01);
(Continued)

(58) Field of Classification Search
CPC ........ B60W 50/0098; B60W 2710/06; B60W 2720/10; B60W 2720/24; B61B 13/00;
(Continued)

(56) References Cited

U.S. PATENT DOCUMENTS 3,519,150 A  7/1970  Keena et al.
3,800,963 A  4/1974  Holland
(Continued)

FOREIGN PATENT DOCUMENTS

CA  2988122 A1  12/2016
CN  101553416 A  10/2009
(Continued)

OTHER PUBLICATIONS

Office Action issued in Chinese Application No. 201980037162.3; dated Sep. 27, 2021 (8 pages).
(Continued)

*Primary Examiner* — Saul Rodriguez
*Assistant Examiner* — Ashley K Romano
(74) *Attorney, Agent, or Firm* — Osha Bergman Watanabe & Burton LLP (57) ABSTRACT

An automated storage and retrieval system includes an automated storage and retrieval grid, a container accessing station, a delivery rail system, and a delivery vehicle operating on the delivery rail system. The automated storage and retrieval grid includes a container handling vehicle rail system for guiding a plurality of container handling vehicles, the container handling vehicle rail system comprising a first set of parallel rails arranged in a horizontal plane (P) and extending in a first direction (X), and a second set of parallel rails arranged in the horizontal plane (P) and extending in a second direction (Y) which is orthogonal to the first direction (X), which first and second sets of rails
(Continued)

form a grid pattern in the horizontal plane (P) comprising a plurality of adjacent container handling vehicle grid cells, each container handling vehicle grid cell comprising a container handling vehicle grid opening defined by a pair of neighboring rails of the first set of rails and a pair of neighboring rails of the second set of rails; and a delivery column adapted for transport of a storage container arranged in a stack of storage containers beneath the container handling vehicle rail system between a container handling vehicle and a delivery port situated at a lower end of the delivery column. The delivery rail system includes at least a first set of parallel rails arranged in a horizontal plane (P1) and extending in a first direction (X), and at least a second set of parallel rails arranged in the horizontal plane (P1) and extending in a second direction (Y) which is orthogonal to the first direction (X), the first and second sets of rails together defining a delivery grid of delivery grid cells. The delivery vehicle includes a motorized vehicle body and a container carrier provided above the motorized vehicle body for carrying the storage container. The delivery vehicle is arranged to transport the storage container from the delivery port of the storage grid across the delivery grid to the delivery grid cell situated below the container accessing station. The container accessing station includes an access opening through which a human and/or robot may access contents of the storage container; a base opening; and a lifting device arranged to retrieve the storage container from a first level beneath the base opening and lift it up through the base opening to a second level so that the storage container may be accessed through the access opening. The delivery vehicle is arranged to deliver the storage container to the lifting device of the container accessing station, or receive a storage container from the lifting device and return the storage container to the delivery port for storage within the storage grid.

15 Claims, 9 Drawing Sheets (51) Int. Cl.
| | | |
|---|---|---|
| *B65G 47/06* | (2006.01) | |
| *B65G 47/52* | (2006.01) | |
| *B65G 63/06* | (2006.01) | |
| *B65G 65/23* | (2006.01) | |
| *B65G 67/24* | (2006.01) | |
| *B65G 43/00* | (2006.01) | |
| *B60W 50/00* | (2006.01) | |
| *G05D 1/02* | (2020.01) | |
| *B61B 13/00* | (2006.01) | |
| *B66F 9/06* | (2006.01) | |
| *B66F 9/19* | (2006.01) | |
| *G05D 1/00* | (2006.01) | |
| *B65G 1/137* | (2006.01) | |
| *B65G 57/03* | (2006.01) | |
| *B65G 63/00* | (2006.01) | |

(52) U.S. Cl.
CPC ......... *B65G 1/0457* (2013.01); *B65G 1/0464* (2013.01); *B65G 1/0471* (2013.01); *B65G 1/0478* (2013.01); *B65G 1/0485* (2013.01); *B65G 1/0492* (2013.01); *B65G 1/065* (2013.01); *B65G 1/1375* (2013.01); *B65G 43/00* (2013.01); *B65G 47/06* (2013.01); *B65G 47/52* (2013.01); *B65G 57/03* (2013.01); *B65G 63/06* (2013.01); *B65G 65/23* (2013.01); *B65G 67/24* (2013.01); *B66F 9/063* (2013.01); *B66F 9/19* (2013.01); *G05D 1/0011* (2013.01); *G05D 1/021* (2013.01); *G05D 1/0291* (2013.01); *B60W 2710/06* (2013.01); *B60W 2720/10* (2013.01); *B60W 2720/24* (2013.01); *B65G 1/1378* (2013.01); *B65G 63/004* (2013.01); *B65G 2201/0235* (2013.01); *B65G 2201/0258* (2013.01); *B65G 2203/0283* (2013.01); *B65G 2203/042* (2013.01); *G05D 1/02* (2013.01); *G05D 1/0229* (2013.01); *G05D 1/0231* (2013.01); *G05D 1/0259* (2013.01); *G05D 1/0289* (2013.01); *G05D 2201/0216* (2013.01)

(58) Field of Classification Search
CPC .. B65G 1/0414; B65G 1/0457; B65G 1/0464; B65G 1/0471; B65G 1/0478; B65G 1/0485; B65G 1/0492; B65G 1/065; B65G 1/1375; B65G 1/1378; B65G 43/00; B65G 47/06; B65G 47/52; B65G 57/03; B65G 63/004; B65G 63/06; B65G 65/23; B65G 67/24; B65G 2201/0235; B65G 2201/0258; B65G 2201/0283; B65G 2201/042; B66F 9/063; B66F 9/19; G05D 1/0011; G05D 1/02; G05D 1/021; G05D 1/0229; G05D 1/0231; G05D 1/0258; G05D 1/0289; G05D 1/0291; G05D 2201/0216

See application file for complete search history.

(56) References Cited

U.S. PATENT DOCUMENTS

| | | | |
|---|---|---|---|
| 4,538,950 | A | 9/1985 | Shiomi et al. |
| 4,909,697 | A | 3/1990 | Bernard, II et al. |
| 5,078,566 | A | 1/1992 | Ferrence |
| 5,360,306 | A | 11/1994 | Nakayama et al. |
| 5,538,809 | A | 7/1996 | Bittihn et al. |
| 7,101,139 | B1 | 9/2006 | Benedict |
| 8,628,289 | B1 | 1/2014 | Benedict et al. |
| 9,527,669 | B1 | 12/2016 | Hanssen et al. |
| 11,685,391 | B2 * | 6/2023 | Austrheim ........... G05D 1/0011 414/807 |
| 2003/0093176 | A1 | 5/2003 | Ohtsuka et al. |
| 2005/0047895 | A1 | 3/2005 | Lert |
| 2008/0014062 | A1 | 1/2008 | Yuyama et al. |
| 2011/0027059 | A1 | 2/2011 | Benedict et al. |
| 2012/0282068 | A1 | 11/2012 | Tschurwald et al. |
| 2014/0014470 | A1 | 1/2014 | Razumov |
| 2014/0086714 | A1 | 3/2014 | Malik |
| 2014/0277693 | A1 | 9/2014 | Naylor |
| 2014/0288696 | A1 | 9/2014 | Lert |
| 2014/0292274 | A1 | 10/2014 | Dorval et al. |
| 2014/0311858 | A1 | 10/2014 | Keating et al. |
| 2015/0127143 | A1 | 5/2015 | Lindbo et al. |
| 2016/0060037 | A1 | 3/2016 | Razumov |
| 2016/0137435 | A1 | 5/2016 | Tanaka et al. |
| 2016/0145058 | A1 | 5/2016 | Lindbo |
| 2016/0176638 | A1 | 6/2016 | Toebes |
| 2016/0194151 | A1 | 7/2016 | Lindbo et al. |
| 2016/0325932 | A1 | 11/2016 | Hognaland |
| 2017/0050809 | A1 | 2/2017 | Itoh et al. |
| 2017/0057745 | A1 | 3/2017 | Jeda et al. |
| 2017/0166400 | A1 | 6/2017 | Hofmann |
| 2018/0029798 | A1 | 2/2018 | Lindbo et al. |
| 2018/0044110 | A1 | 2/2018 | Clarke et al. |
| 2018/0068253 | A1 | 3/2018 | Simms et al. |
| 2018/0082162 | A1 | 3/2018 | Durham et al. |
| 2018/0118078 | A1 | 5/2018 | Alkhaldi et al. |
| 2018/0141754 | A1 | 5/2018 | Garrett et al. |
| 2018/0150793 | A1 | 5/2018 | Lert, Jr. et al. |
| 2018/0305123 | A1 | 10/2018 | Lert, Jr. et al. |
| 2018/0370726 | A1 | 12/2018 | Grosse et al. |

(56) References Cited

U.S. PATENT DOCUMENTS

| | | | |
|---|---|---|---|
| 2020/0148474 A1 | 5/2020 | Salichs et al. | |
| 2021/0130091 A1* | 5/2021 | Austrheim | B65G 67/24 |
| 2021/0221618 A1* | 7/2021 | Austrheim | B65G 47/46 |
| 2022/0241627 A1* | 8/2022 | Austrheim | G06Q 10/06 |
| 2022/0274781 A1* | 9/2022 | Austrheim | B65G 1/0464 |
| 2022/0281684 A1* | 9/2022 | Fjeldheim | B65G 1/1373 |

FOREIGN PATENT DOCUMENTS

| | | |
|---|---|---|
| CN | 101711210 A | 5/2010 |
| CN | 102050333 A | 5/2011 |
| CN | 102992012 A | 3/2013 |
| CN | 104066661 A | 9/2014 |
| CN | 104443976 A | 3/2015 |
| CN | 104781163 A | 7/2015 |
| CN | 104837747 A | 8/2015 |
| CN | 104885106 A | 9/2015 |
| CN | 105383848 A | 3/2016 |
| CN | 105517923 A | 4/2016 |
| CN | 105899398 A | 8/2016 |
| CN | 105947514 A | 9/2016 |
| CN | 106064718 A | 11/2016 |
| CN | 106241154 A | 12/2016 |
| CN | 106414278 A | 2/2017 |
| CN | 106575391 A | 4/2017 |
| CN | 106660703 A | 5/2017 |
| CN | 106662874 A | 5/2017 |
| CN | 106829298 A | 6/2017 |
| CN | 107428465 A | 12/2017 |
| CN | 206790852 U | 12/2017 |
| CN | 107848707 A | 3/2018 |
| CN | 108140168 A | 6/2018 |
| CN | 108430895 A | 8/2018 |
| CN | 109328150 A | 2/2019 |
| CN | 109982948 A | 7/2019 |
| DE | 4016810 C1 | 11/1991 |
| DE | 9310690 U1 | 9/1993 |
| DE | 102009017241 A1 | 10/2010 |
| EP | 0458021 A1 | 11/1991 |
| EP | 0493327 A1 | 7/1992 |
| EP | 0534558 A1 | 3/1993 |
| EP | 2881905 A1 | 6/2015 |
| EP | 3003932 A1 | 4/2016 |
| GB | 1 267 751 A | 3/1972 |
| GB | 1276160 A | 6/1972 |
| GB | 2106070 A | 4/1983 |
| GB | 2233319 A | 1/1991 |
| JP | S60-137703 A | 7/1985 |
| JP | S6417707 A | 1/1989 |
| JP | S6485656 A | 3/1989 |
| JP | H06-043936 A | 2/1994 |
| JP | H08-217209 A | 8/1996 |
| JP | H09-152914 A | 6/1997 |
| JP | H11-143538 A | 5/1999 |
| JP | 2000191106 A | 7/2000 |
| JP | 2003137406 A | 5/2003 |
| JP | 2009184775 A | 8/2009 |
| JP | 2009541177 A | 11/2009 |
| JP | 2011-102166 A | 5/2011 |
| JP | 2015-535517 A | 12/2015 |
| JP | 2017088404 A | 5/2017 |
| JP | 2017-524625 A | 8/2017 |
| KR | 20170026074 A | 3/2017 |
| NO | 317366 B1 | 10/2004 |
| NO | 20171064 A1 | 12/2018 |
| RU | 2008111257 A | 10/2009 |
| WO | 96/14258 A1 | 5/1996 |
| WO | 9614258 A1 | 5/1996 |
| WO | 2005/077789 A1 | 8/2005 |
| WO | 2012/106746 A1 | 8/2012 |
| WO | 2014/075937 A1 | 5/2014 |
| WO | 2014072442 A1 | 5/2014 |
| WO | 2014/090684 A1 | 6/2014 |
| WO | 2014/195901 A1 | 12/2014 |
| WO | 2015/084236 A1 | 6/2015 |
| WO | 2015/170660 A1 | 11/2015 |
| WO | 2015/193278 A1 | 12/2015 |
| WO | 2016166294 A1 | 10/2016 |
| WO | 2016166323 A1 | 10/2016 |
| WO | 2016/191777 A1 | 12/2016 |
| WO | 2016/196815 A1 | 12/2016 |
| WO | 2016/198467 A1 | 12/2016 |
| WO | 2016/198565 A1 | 12/2016 |
| WO | 2017/081281 A1 | 5/2017 |
| WO | 2017081273 A1 | 5/2017 |
| WO | 2017/121512 A1 | 7/2017 |
| WO | 2017/121515 A1 | 7/2017 |
| WO | 2017153563 A1 | 9/2017 |
| WO | 2017/211640 A1 | 12/2017 |
| WO | 2018/162757 A1 | 9/2018 |
| WO | 2018/233886 A1 | 12/2018 |
| WO | 2019/141877 A1 | 7/2019 |

OTHER PUBLICATIONS

Extended European Search Report issued in European Application No. 21186410.3, dated Nov. 25, 2021 (5 pages).
Norwegian Search Report issued in No. 20181005 dated Feb. 6, 2019 (2 pages).
International Search Report issued in International Application No. PCT/EP2019/065184 , dated Sep. 6, 2019 (4 pages).
Written Opinion issued in International Application No. PCT/EP2019/065184 ; dated Sep. 6, 2019 (9 pages).
International Preliminary Report on Patentability issued in International Application No. PCT/EP2019/065184; dated Oct. 2, 2020 (12 pages).
Office Action in counterpart Chinese Patent Application No. 2019800538763 dated Dec. 6, 2021 (13 pages).
Office Action in counterpart Chinese Patent Application No. 2019800393798 dated Dec. 9, 2021 (17 pages).
Office Action issued in Chinese Application No. 2020800592135 dated Feb. 1, 2023 (21 pages).
Office Action in counterpart Chinese Patent Application No. 201980038106.1 dated Sep. 8, 2021 (10 pages).
Office Action in counterpart Chinese Patent Application No. 201980039693.6 dated Oct. 18, 2021 (12 pages).
United States Office Action in related U.S. Appl. No. 16/972,482, dated Mar. 22, 2022 (46 pages).
Office Action issued in the counterpart Chinese Patent Application No. 201980037723X, dated Sep. 17, 2021 (25 pages).
Office Action issued in the counterpart Chinese Patent Application No. 2019800383353, dated Dec. 17, 2021 (3 pages).
Office Action issued in Chinese Application No. 2019800846410 dated May 6, 2022 (8 pages).
Office Action in counterpart Chinese Patent Application No. 201980039028.7 dated Oct. 27, 2021 (15 pages).
Office Action in counterpart Chinese Patent Application No. 201980039046.5 dated Sep. 15, 2021 (18 pages).
Office Action in counterpart Chinese Patent Application No. 201980039068.1 dated Sep. 15, 2021 (23 pages).
Office Action in counterpart Chinese Patent Application No. 201980038856.9 dated Oct. 19, 2021 (16 pages).
Office Action in the counterpart Japanese Application No. 2020-569128, dated Jul. 3, 2023 (6 pages).
Office Action issued in counterpart Japanese Patent Application No. 2020-568698 dated May 29, 2023 (10 pages).
Office Action issued in counterpart Japanese Patent Application No. 2020-569140 dated Jun. 2, 2023 (5 pages).
Office Action issued in counterpart Japanese Patent Application No. 2020-568714 dated Jul. 3, 2023 (16 pages).
Office Action issued in counterpart Japanese Patent Application No. 2020-568805 dated Jun. 5, 2023 (10 pages).
Office Action in the counterpart Japanese Application No. 2020-568712, dated Jun. 26, 2023 (7 pages).

* cited by examiner

CONTAINER ACCESSING STATION WITH LIFTING DEVICE

The present invention is related to a container accessing station comprising a lifting device arranged to retrieve a storage container from a first level beneath a base opening and lift it up through the base opening to a second level so that the container may be accessed through the access opening. The invention is also related to a container accessing system, an automated storage and retrieval system and a method of accessing a storage container.

BACKGROUND AND PRIOR ART

Figure 1:
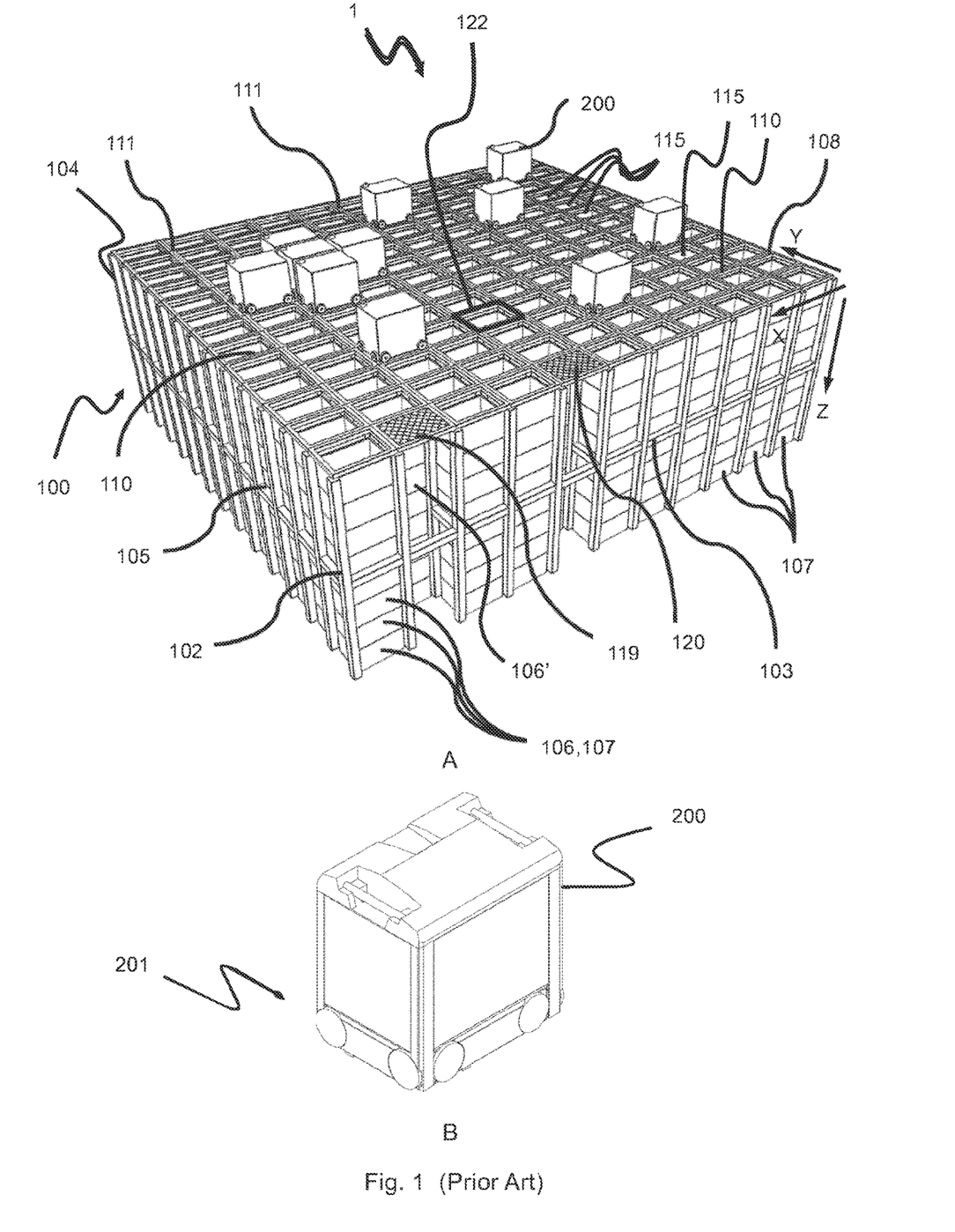

FIGS. 1A and 1C disclose a typical prior art automated storage and retrieval system 1 with a framework structure 100. FIGS. 1B and 1D disclose a prior art container handling vehicle 101 operating the system 1 disclosed in FIGS. 1A and 1C, respectively.

The framework structure 100 comprises a plurality of upright members 102 and optionally a plurality of horizontal members 103 supporting the upright members 102. The members 102, 103 may typically be made of metal, e.g. extruded aluminum profiles.

The framework structure 100 defines a storage grid 104 comprising storage columns 105 arranged in rows, in which storage columns 105 of storage containers 106, also known as bins, are stacked one on top of another to form stacks 107. Each storage container 106 may typically hold a plurality of product items (not shown), and the product items within a storage container 106 may be identical or may be of different product types depending on the application.

The storage grid 104 guards against horizontal movement of the storage containers 106 in the stacks 107, and guides vertical movement of the storage containers 106, but does normally not otherwise support the storage containers 106 when stacked. The automated storage and retrieval system 1 comprises a rail system 108 arranged in a grid pattern across the top of the storage 104, on which rail system 108 a plurality of container handling vehicles 200, 300 (as exemplified in FIGS. 1B and 1D) are operated to raise storage containers 106 from, and lower storage containers 106 into, the storage columns 105, and also to transport the storage containers 106 above the storage columns 105. The horizontal extent of one of the grid cells 122 constituting the grid pattern is in FIGS. 1A and 1C marked by thick lines.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122 due to the horizontal extent of the rails 110, 111.

The rail system 108 comprises a first set of parallel rails 110 arranged to guide movement of the container handling vehicles 200, 300 in a first direction X across the top of the frame structure 100, and a second set of parallel rails 111 arranged perpendicular to the first set of rails 110 to guide movement of the container handling vehicles 200, 300 in a second direction Y which is perpendicular to the first direction X. In this way, the rail system 108 defines grid columns above which the container handling vehicles 200, 300 can move laterally above the storage columns 105, i.e. in a plane which is parallel to the horizontal X-Y plane.

Each prior art container handling vehicle 200, 300 comprises a vehicle body and a wheel arrangement of eight wheels 201, 301 where a first set of four wheels enable the lateral movement of the container handling vehicles 200, 300 in the X direction and a second set of the remaining four wheels enable the lateral movement in the Y direction. One or both sets of wheels in the wheel arrangement can be lifted and lowered, so that the first set of wheels and/or the second set of wheels can be engaged with the respective set of rails 110, 111 at any one time.

Each prior art container handling vehicle 200, 300 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping engaging devices can be lowered from the vehicle 201, 301 so that the position of the gripping/engaging devices with respect to the vehicle 201, 301 can be adjusted in a third direction L which is orthogonal the first direction X and the second direction Y.

Conventionally, and also for the purpose of this application, Z=1 identifies the uppermost layer of the grid 104, i.e. the layer immediately below the rail system 108, Z=2 the second layer below the rail system 108, Z=3 the third layer etc. In the exemplary prior art grid 104 disclosed in FIGS. 1A and 1C, Z=8 identifies the lowermost, bottom layer of the grid 104, Consequently, as an example, and using the Cartesian coordinate system X, Y, Z indicated in FIGS. 1A and 1D, the storage container identified as 106' in FIG. 1A can be said to occupy grid location or cell X=10, Y=2, Z=3. The container handling vehicles 101 can be said to travel in layer Z=0 and each grid column can be identified by its X and Y coordinates.

Each container handling vehicle 200 comprises a storage compartment or space (not shown) for receiving and stowing a storage container 106 when transporting the storage container 106 across the rail system 108. The storage space may comprise a cavity arranged centrally within the vehicle body, e.g. as is described in WO2014/090684A1, the contents of which are incorporated herein by reference.

Alternatively, the container handling vehicles 300 may have a cantilever construction, as is described in NO317366, the contents of which are also incorporated herein by reference.

The container handling vehicles 200 may have a footprint, i.e. an extent in the X and Y directions, which is generally equal to the lateral extent of a grid cell 122, i.e. the extent of a grid cell 122 in the X and Y directions, e.g. as is described in WO2015/193278A1, the contents of which are incorporated herein by reference. The term "lateral" used herein may mean "horizontal".

Alternatively, the container handling vehicles 200 may have a footprint which is larger than the lateral extent of (lateral area defined by) a grid column 105, e.g. as is disclosed in WO2014/090684A1.

Figure 2:
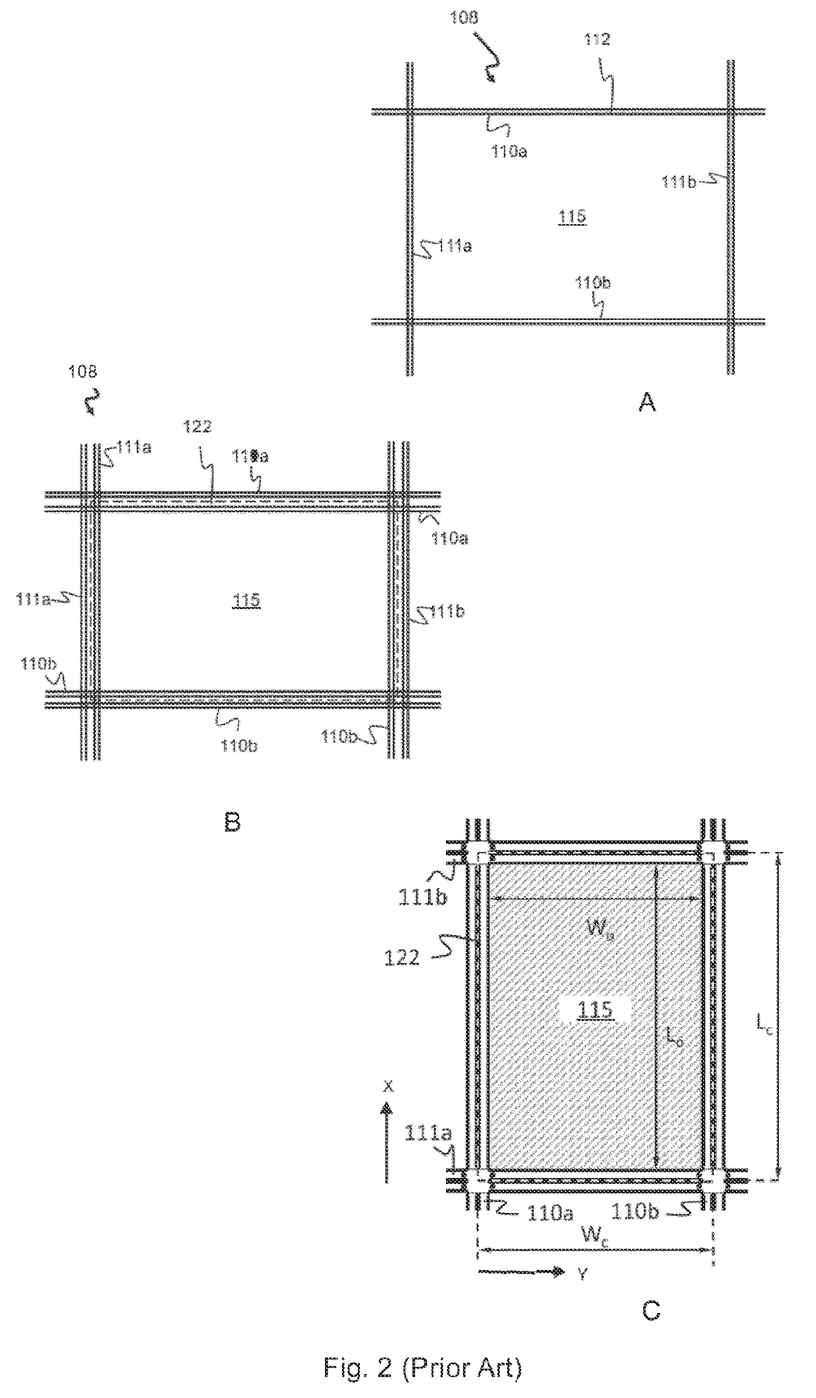
FIG. 2A-C Is a view from top of a grid cell comprising a set of parallel rails arranged to guide movement of a remotely operated vehicle.

The rail system 108 may be a single rail system, as is shown in FIG. 2A. Alternatively, the rail system 108 may be a double rail system, as is shown in FIG. 2B, thus allowing a container handling vehicle 201 having a footprint generally corresponding to the lateral area defined by a grid column 112 to travel along a row of grid columns even if another container handling vehicle 200 is positioned above a grid column neighboring that row. Both the single and double rail system, or a combination comprising a single and double rail arrangement in a single rail system 108, forms a grid pattern in the horizontal plane P comprising a plurality of rectangular and uniform grid locations or grid cells 122, where each grid cell 122 comprises a grid opening 115 being delimited by a pair of rails 110a, 110b of the first rails 110 and a pair of rails 111a, 111b of the second set of rails 111. In FIG. 2B the grid cell 122 is indicated by a dashed box.

Consequently, rails 110a and 110b form pairs of rails defining parallel rows of grid cells running in the X direction, and rails 111a and 111b form pairs of rails defining parallel rows of grid cells running in the Y direction.

As shown in FIG. 2C, each grid cell 122 has a width $W_c$ which is typically within the interval of 30 to 150 cm, and a length $L_c$ which is typically within the interval of 50 to 200 cm. Each grid opening 115 has a width $W_o$ and a length $L_o$ which is typically 2 to 10 cm less than the width $W_c$ and the length $L_c$ of the grid cell 122.

In the X and Y directions, neighboring grid cells are arranged in contact with each other such that there is no space there-between.

In a storage grid 104, a majority of the grid columns are storage columns 105, i.e. grid columns 105 where storage containers 106 are stored in stacks 107. However, a grid 104 normally has at least one grid column which is used not for storing storage containers 106, but which comprises a location where the container handling vehicles 200, 300 can drop off and/or pick up storage containers 106 so that they can be transported to a second location (not shown) where the storage containers 106 can be accessed from outside of the grid 104 or transferred out of or into the grid 104. Within the art, such a location is normally referred to as a "port" and the grid column in which the port is located may be referred to as a "delivery column" 119, 120. The drop-off and pick-up ports of the container handling vehicles are referred to as the "upper ports of a delivery column" 119, 120. While the opposite end of the delivery column is referred to as the "lower ports of a delivery column".

The storage grids 104 in FIGS. 1A and 1C comprise two delivery columns 119 and 120. The first delivery column 119 may for example comprise a dedicated drop-off port where the container handling vehicles 200, 300 can drop off storage containers 106 to be transported through the delivery column 119 and further to an access or a transfer station, and the second delivery column 120 may comprise a dedicated pick-up port where the container handling vehicles 200, 300 can pick up storage containers 106 that have been transported through the delivery column 120 from an access or a transfer station. Each of the ports of the first and second delivery column may comprise a port suitable for both pick up and drop of storage containers.

A container accessing station may typically be a picking or a stocking station where product items are removed from or positioned into the storage containers 106. In a picking or a stocking station, the storage containers 106 are normally never removed from the automated storage and retrieval system 1 but are returned into the storage grid 104 once accessed. For transfer of storage containers out or into the storage grid 104, there are also lower ports provided in a delivery column, such lower ports are e.g. for transferring storage containers 106 to another storage facility (e.g. to another storage grid), directly to a transport vehicle (e.g. a train or a lorry), or to a production facility.

When a storage container 106 stored in the grid 104 disclosed in FIG. 1A is to be accessed, one of the container handling vehicles 200, 300 is instructed to retrieve the target storage container 106 from its position in the grid 104 and to transport it to or through the delivery column 119. This operation involves moving the container handling vehicle 200, 300 to a grid location above the storage column 105 in which the target storage container 106 is positioned, retrieving the storage container 106 from the storage column 105 using the container handling vehicle's lifting device (not shown), and transporting the storage container 106 to the delivery column 119. If the target storage container 106 is located deep within a stack 107, i.e. with one or a plurality of other storage containers positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle 200, 300 that is subsequently used for transporting the target storage container 106 to the delivery column, or with one or a plurality of other cooperating container handling vehicles 200, 300. Alternatively, or in addition, the automated storage and retrieval system 1 may have container handling vehicles 200, 300 specifically dedicated to the task of temporarily removing storage containers 106 from a storage column 105. Once the target storage container 106 has been removed from the storage column 105, the temporarily removed storage containers can be repositioned into the original storage column 105. However, the removed storage containers may alternatively be relocated to other storage columns 105.

When a storage container 106 is to be stored in the grid 104, one of the container handling vehicles 200, 300 is instructed to pick up the storage container 106 from the delivery column 120 and to transport it to a grid location above the storage column 105 where it is to be stored. After any storage containers positioned at or above the target position within the storage column stack 107 have been removed, the container handling vehicle 200, 300 positions the storage container 106 at the desired position. The removed storage containers may then be lowered back into the storage column 105 or relocated to other storage columns 105.

A problem associated with known automated storage and retrieval systems 1 is that the area surrounding the pick-up and drop-off ports may become congested with container handling vehicles 200, 300 instructed to drop off or pick up storage containers 106. This may seriously impede the operation of the automated storage and retrieval system 1. In small systems this situation may possibly be alleviated by adding delivery columns to the grid, as this will allow the container handling vehicles 200, 300 to be distributed among a larger number of ports of delivery columns in order to avoid congestion. However, if ports and columns are added, the conveyor system infrastructure must normally be increased. This requires space, which may not necessarily be available. Also, adding conveyor system infrastructure is costly.

Another problem with prior art automated storage and retrieval systems 1 is that the separate drop-off ports and pick-up ports of the delivery columns 119, 120 require the container handling vehicles 200, 300 to move to a storage column 105 after drop-off to retrieve a new storage container 106. Likewise, the container handling vehicles 200, 300 have to be empty of a storage container 106 when they are sent to a pick-up port 120 to pick up a storage container. This results in an inefficiency and causes increased congestion around the ports, as container handling vehicles 200, 300 are moving around on the grid without a storage container 106 as payload.

In addition, the delivery columns 119, 120 may take up space on the grid 104 which could be used for other purposes such as the movement of container handling vehicles 200, 300.

In some cases, there might be a desire to separate the storage and retrieval system from public places or consumer-accessible places, due to safety or space considerations, such as in a supermarket or a department store.

In view of the above, it is desirable to provide an automated storage and retrieval system, and a method for operating such a system, that solve or at least mitigate one or more of the aforementioned problem related to use of prior art storage and retrieval systems.

An objective of the invention is to provide an automated storage and retrieval system which is more effective than prior art systems by avoiding or at least reducing congestion of storage containers around the delivery column.

It is an object of the present invention to provide an effective storage and retrieval system that takes up less space on a consumer-accessible level and where elements of the storage and retrieval system may be hidden and secure.

Another objective is to provide a high efficiency automated storage and retrieval system which are easy to install, and which delivery capacity can easily be increased after completed installation.

Yet another objective is to provide a dedicated area where storage containers and items held in the storage containers effectively and easily can be handled at a consumer-accessible level.

SUMMARY OF THE INVENTION

The present invention is directed to a container accessing station for accessing a storage container of an automated storage and retrieval grid. The container accessing station comprising:
  an access opening through which a human and/or robot may access contents of the container,
  a base opening; and
  a lifting device arranged to retrieve the container from a first level beneath the base opening and lift it up through the base opening to a second level so that the container may be accessed through the access opening.

The lift device may be configured to move the storage container in a substantially vertical or purely vertical direction between the first level and the second level.

The first level may be located on a first floor and the second level may be located on a second floor, the first and the second floors being vertically displaced relative to each other, wherein the lifting device is arranged for lifting or lowering a storage container between the first floor and the second floor.

The first floor may be an area with restricted access for personnel or consumers, and the second floor may be an area where the personnel and/or customers operate, such as in a department store, office, school, etc. When an item is ordered, the automated storage and retrieval system retrieves a storage container containing the stored items and delivers it to the container accessing station. In this way the entire storage and retrieval system may be hided from the personnel or consumers, thus saving space and increasing safety.

The lifting device may extend beneath the base opening and comprise a lifting frame for releasable connection to the storage container and a lift mechanism arranged to move the lifting frame from the first level to the second level.

The lift mechanism may comprise a guide structure extending in a vertical direction at least from the first level to the second level, and the lifting frame may be connected to the guide structure and operable along at least a section of the guide structure.

The lifting frame may operate along at least a section of the guide structure my means of a motor situated on the lifting frame or on the lift mechanism. Thus, the motor may be configured to drive the lifting frame along at least a section of the guide structure.

The lifting frame may be connected to the guide structure such that the lifting frame extends perpendicularly to the guide structure. Thus, the lifting frame may be in a horizontal or substantial horizontal position and the guide structure in a vertical or substantial vertical position.

The lifting frame may comprise four corner sections, and gripper elements for releasable connection to the storage container. The four corners gripping structure may maintain the storage container in a motionless or near motionless position on the lifting frame.

The gripper elements may be driven by a gripper motor situated at a periphery of the lifting frame. A control module may be connected to the gripper motors and controls the gripper motors.

The storage container may comprise a plurality of recesses provided at the periphery of the opening of the storage containers, wherein each recess is configured to receive a corresponding gripper element for releasable connection of the storage container to the lifting frame. The gripper elements may be configured to releasably connect to the storage container using the recesses.

The lifting frame may provide an opening (OLF) in which an item stored in the storage container can be reached by the human and/or robotic operator at the container accessing station, through the opening (OLF) of the lifting frame. The opening (OLF) may align with the access opening when the lifting frame is at the second level so that contents of a container carried by the lifting frame may be accessed via the access opening and opening (OLF).

The lift mechanism may comprise a hoist frame with an opening (OHF) provided at the access opening defining an access perimeter and comprises a plurality of lifting bands guided by the hoist frame. The lifting frame may be suspended in a horizontal orientation from the hoist frame by the plurality of lifting bands, wherein the access perimeter of the opening in the hoist frame corresponds in shape and alignment to the access perimeter of the opening (OLF) in the lifting frame to allow access to items stored in the storage container through the respective openings (OHF, OLF), when the lifting frame has been lifted up to the hoist frame by the lift mechanism.

The hoist frame may comprise a pair of arms and a sheave may be connected to a distal end of each arm.

The lift mechanism may comprise a lifting shaft for winding/unwinding the lifting bands simultaneously.

The lifting bands may be operated unwound (unwinding) such that they deploy the lifting frame through the base opening where the lifting frame connects to an upper surface of the storage container, and whereupon the lifting bands are operated wound (winding) such that they lift the storage container through the base opening and to the access opening.

The container accessing station may comprise a cabinet body arranged about the access opening and the base opening such that a container lifted into the cabinet body by the lifting device is only accessible through the access opening.

The access opening may be in an upper part of the cabinet body, and the base opening may be provided at a lower part of the cabinet body. Thus, the storage container is lifted from the first level, beneath the cabinet body, through the base opening and to the second level at the upper part of the cabinet body, so that the storage container may be accessed through the access opening.

The base opening may be provided above and adjacent to a floor opening provided between the first level and the second level or the first floor and the second floor of a building.

The container accessing station may comprise a deployable cover for restricting access through the access opening. The deployable cover may be a retractable cover. The cover may be arranged to open only if predetermined conditions are satisfied (e.g. if access to a container is authorised) and may thereby permit access to a container through the access opening when the container is at the second level.

The cover may be transparent and may allow the contents of a container to be viewed from outside the container accessing station.

The present invention may also be directed to a container accessing system comprising a container accessing station as described above, and a delivery rail system.

The delivery rail system may comprise at least a first set of parallel rails arranged in a horizontal plane (P1) and extending in a first direction (X), and at least a second set of parallel rails arranged in the horizontal plane (P1) and extending in a second direction (Y) which is orthogonal to the first direction (X), the first and second sets of rails together defining a delivery grid of delivery grid cells, and
- a remotely operated delivery vehicle operating on the delivery rail system and comprising a motorized vehicle body and a container carrier provided above the motorized vehicle body for carrying a storage container, wherein the remotely operated delivery vehicle is configured to deliver the storage container to the container accessing station, and the lifting device of the container accessing station is arranged to retrieve the storage container from the remotely operated delivery vehicle at the first level.

By the arrangement of the lift device, the storage container is to be efficiently transported between a delivery rail system and a container accessing station that are vertically displaced relative each other, thereby allowing a delivery rail system to be located on a different level than the accessing station, thus allowing efficient utilization of available floor space.

The present invention may also be directed to a container accessing system comprising a container accessing station as described above, and an automated storage and retrieval grid system.

The automated storage and retrieval grid may be located on a level below the container accessing station. A container handling vehicle may be adapted to retrieve a storage container from a storage column of the automated storage and retrieval grid and deliver the storage container to the container accessing station. The lifting device of the container accessing station is arranged to retrieve the storage container from the container handling vehicle at the first level and lifts the storage container from the first level to the second level.

Thus, the container accessing station may be disposed on a floor above the delivery grid of a delivery system or above a storage and retrieval grid of a container storage and retrieval system.

The container accessing system may comprise a plurality of container accessing stations as described above.

The present invention may also be directed to an automated storage and retrieval system comprising the container accessing station, an automated storage and retrieval grid and a delivery system for transporting the storage container between the automated storage and retrieval grid and the container accessing station.

The automated storage and retrieval grid comprises:
- a container handling vehicle rail system for guiding a plurality of container handling vehicles, the container handling vehicle rail system comprising a first set of parallel rails arranged in a horizontal plane (P) and extending in a first direction (X), and a second set of parallel rails arranged in the horizontal plane (P) and extending in a second direction (Y) which is orthogonal to the first direction (X), which first and second sets of rails form a grid pattern in the horizontal plane (P) comprising a plurality of adjacent container handling vehicle grid cells, each container handling vehicle grid cell comprising a container handling vehicle grid opening defined by a pair of neighboring rails of the first set of rails and a pair of neighboring rails of the second set of rails; and
- a delivery column adapted for transport of a storage container arranged in a stack of storage containers beneath the container handling vehicle rail system between a container handling vehicle and a delivery port situated at a lower end of the delivery column.

The delivery vehicle is arranged to transport the storage container from the delivery port of the storage grid across the delivery grid to the delivery grid cell situated vertically below the container accessing station and return it to the delivery port for storage within the storage grid.

The automated storage and retrieval grid comprises vertical members defining multiple storage columns for storing storage containers on top of each other in vertical stacks. The vertical members are interconnected at their upper ends by a container handling vehicle rail system arranged to guide at least one container handling vehicle.

The container handling vehicle is configured to raise storage containers from, and lower storage containers into, the storage columns, and to transport the storage containers above the storage columns.

The container handling vehicle rail system is arranged in a first horizontal plane and comprises a first set of parallel rails extending in a first direction X, and a second set of parallel rails and extending in a second direction Y which is orthogonal to the first direction X. The first and second sets of rails form a grid pattern in the first horizontal plane comprising a plurality of adjacent container handling vehicle grid cells, Each container handling vehicle grid cell comprises a container handling vehicle grid opening defined by a pair of neighboring rails of the first set of rails and a pair of neighboring rails of the second set of rails. Further, the automated storage and retrieval grid comprises a transfer column adapted for transport of a storage container between the container handling vehicle and a delivery space situated at a lower end of the transfer column.

The delivery system comprises a first delivery rail system having at least one set of parallel rails arranged in a second horizontal plane guiding at least one delivery vehicle thereon.

The delivery vehicle is adapted to receive and/or deliver a storage container at a storage container delivery location arranged below the delivery port of the delivery column and to move between the storage grid and the container accessing station.

The first delivery rail system covers at least an area extending from the delivery port of the storage grid to the container accessing station.

The present invention is also directed to a method of accessing a storage container through a container accessing station. The container accessing station comprises:

an access opening through which a human and/or robot may access contents of the storage container (106);
a base opening (62); and
a lifting device (70).

The method comprises: retrieving the storage container from a first level using the lifting device and lifting the storage container up through the base opening to a second level; and accessing the storage container at the second level through the access opening.

BRIEF DESCRIPTION OF THE DRAWINGS

Following drawings are appended by way of example only to facilitate the understanding of the invention.

FIG. 1A-D are perspectives view of a prior art automated storage and retrieval system, where FIG. 1A and FIG. 1C shows the complete system and FIG. 1B and FIG. 1D shows examples of system operable prior art container handling vehicles.

FIG. 5A-B shows a container accessing station according to an embodiment of the present invention where FIG. 5B shows a storage container at the second level.

DETAILED DESCRIPTION OF THE INVENTION

In the following, embodiments of the invention will be discussed in more detail with reference to the appended drawings. It should be understood, however, that the drawings are not intended to limit the invention to the subject-matter depicted in the drawings. Furthermore, even if some of the features are described in relation to the system only, it is apparent that they are valid for the delivery vehicles and related methods as well, and vice versa, Hence, any features described in relation to the delivery vehicle only, and/or related methods, are also valid for the system.

With reference to FIGS. 1A-D the storage grid 104 of each storage structure 1 constitutes a framework 100 of in total 143 grid columns 112, where the width and length of the framework corresponds to the width and length of 13 and 11 grid columns 112, respectively. The top layer of the framework 100 is a rail system 108 onto which a plurality of container handling vehicles 200, 300 are operated.

Figure 3:
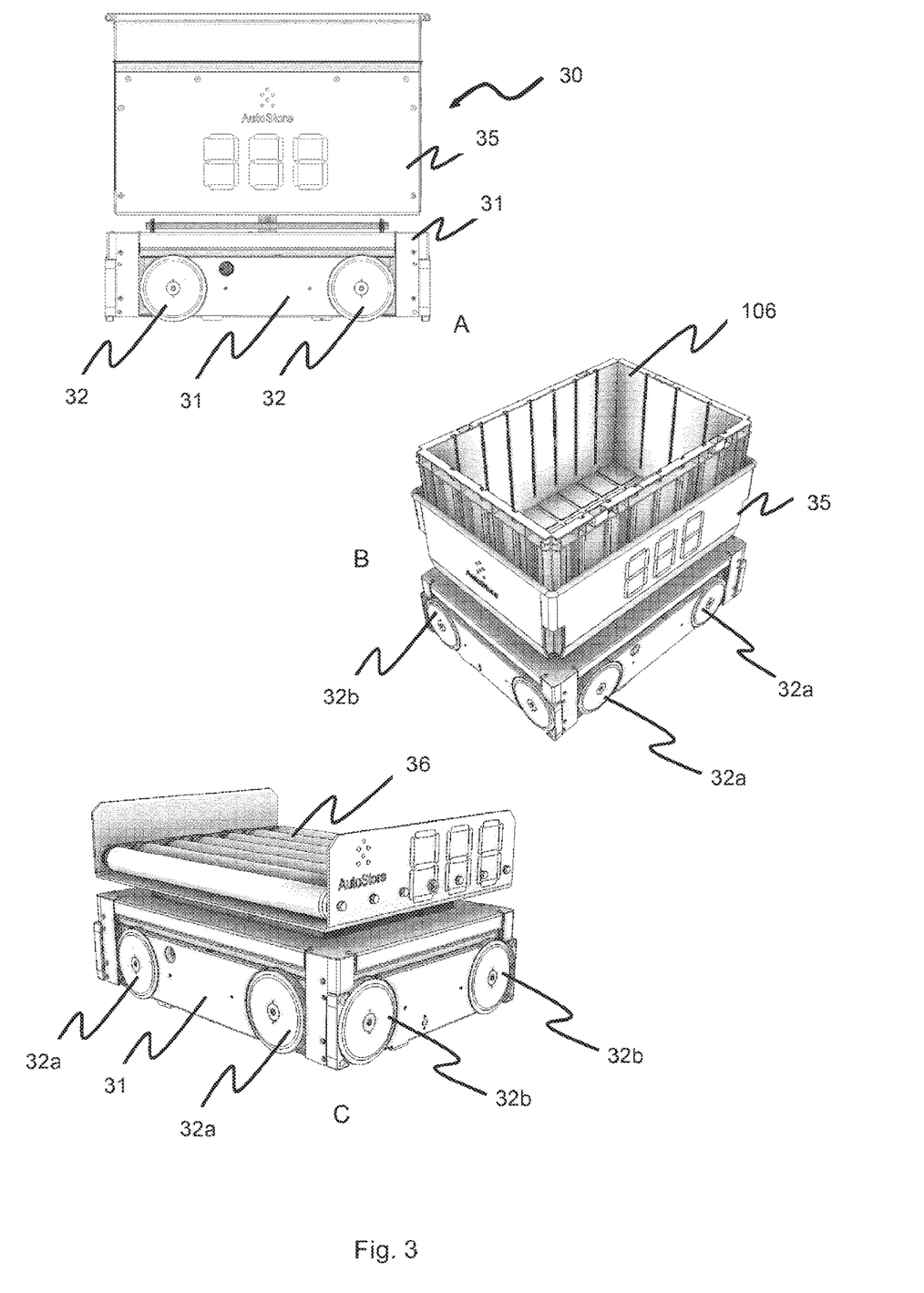
FIG. 3A-C shows different versions of a remotely operated delivery vehicle arranged for transporting a storage container between the storage grid and the container accessing station.
Figure 4:
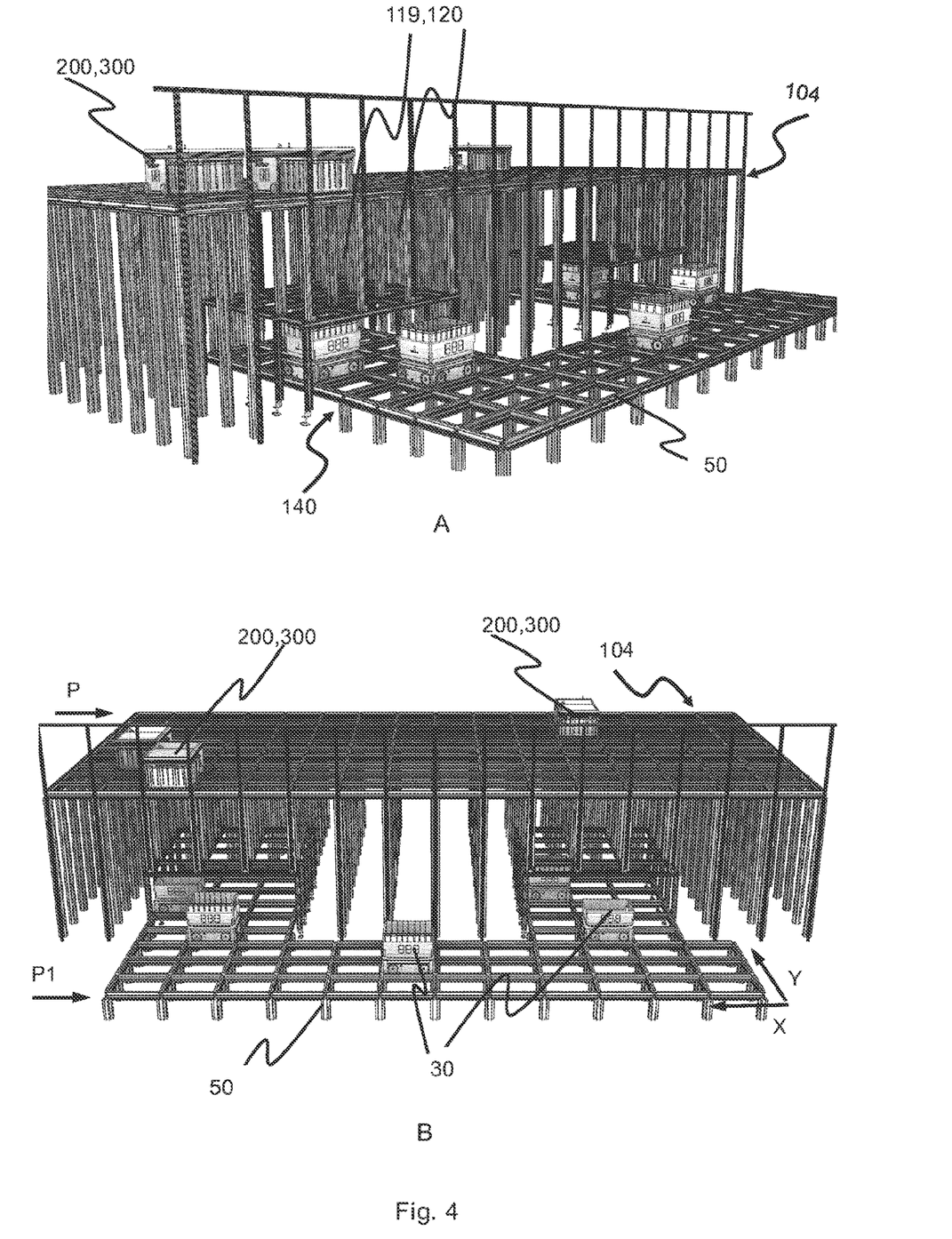
FIG. 4A-B is a perspective view of another automated storage and retrieval grid and a delivery system for transporting storage container between the storage grid and a container accessing station.

The framework 100 of the storage system 1 is constructed in accordance with the above mentioned prior art framework 100 described above, i.e. a plurality of upright members 102 and a plurality of horizontal members 103 which are supported by the upright members 102, and further that the horizontal members 103 includes the rail system 108 of parallel rails 110, 111 in the X direction and the Y direction, respectively, arranged across the top of storage columns 105. The horizontal area of a single grid cell 122, i.e. along the X and Y directions, may be defined by the distance between adjacent rails 110 and 111, respectively (see also FIGS. 3 and 4). In FIGS. 1A and 1C, such a grid cell 122 is marked on the rail system 108 by thick lines.

The rail system 108 allows the container handling vehicles 200, 300 to move horizontally between different grid locations, where each grid location is associated with a grid cell 122.

In FIGS. 1A and 1C the storage grid 104 is shown with a height of eight cells. It is understood, however, that the storage grid 104 can in principle be of any size. In particular it is understood that storage grid 104 can be considerably wider and/or longer than disclosed in FIGS. 1A and 1C. For example, the grid 104 may have a horizontal extent of more than 700×700 grid cells 122. Also, the grid 104 can be considerably deeper than disclosed in FIGS. 1A and 1C. For example, the storage grid 104 may be more than twelve grid cells deep.

The storage container vehicles 200, 300 may be of any type known in the art, e.g. any one of the automated container handling vehicles disclosed in WO2014/090684 A1, in NO317366 or in WO2015/193278A1.

The rail system 108 may be a single rail system, as is shown in FIG. 2A. Alternatively, the rail system 108 may be a double rail system, as is shown in FIG. 2B. Details of the single and double rail system are disclosed this specification under the section of background and prior art.

FIG. 3A-C shows an embodiment of a remotely operated delivery vehicle 30, hereinafter referred to as a delivery vehicle 30.

The delivery vehicle 30 is configured for transport of a storage container 106 (not shown) between an automated storage and retrieval grid 104 (see FIGS. 4A and B) configured to store a plurality of stacks 107 of storage containers 106, hereinafter referred to as a storage grid 104, and a access opening 61 provided in a container accessing station 60 for handling of the storage container 106 by at least one of a robotic operator and human operator.

Said delivery vehicle 30 comprises; a vehicle body 31, a rolling device 32a, 32b connected to the vehicle body 31, a rolling device motor for driving the rolling device 32a, 32b in a horizontal plane (P), and a power source (not shown) connected to the rolling device motor. The power source should provide sufficient power to the rolling device motor (not shown) to propel the rolling device 32a, 32h over a set route from the storage grid 104, for example to an access station 60.

The delivery vehicle 30 may further comprise a container carrier 35 mounted above the vehicle body 31. The container carrier 35 should be configured to receive the storage container 106 onto or within the container carrier 35 such that the storage container 106 is prevented to slide along the horizontal plane (P1).

The container carrier 35 may comprise a container supporting device supporting the storage container 106 from below.

In FIG. 3A-B the container carrier 35 is disclosed in the form of a storage container receiving compartment having a bottom base and side walls. The volume of the compartment is in this exemplary configuration such that it may receive and contain the entire horizontal extent of the storage container and at least a part of the vertical extent of the storage container.

The particular configuration of the container carrier 35 disclosed in 3A-B allows the delivery vehicle 30 to transport of a storage container 106 having different heights.

Note that the size of the compartment within the container carrier 35 may easily be adapted for receiving and supporting a multiple number of storage containers 106 in one operation.

FIG. 3C shows yet another exemplary configuration of the remotely operated delivery vehicle 30. In this configuration the container carrier 35 comprises a base plate, a conveyor arranged on the base plate and two side walls protruding upwards from the base plate. The rolling device 32 and the vehicle body 31 are equal or similar to the rolling device 32 and the vehicle body 31 described above.

The conveyor may be set up by inter ilia a plurality of parallel oriented rolls 36 having a common longitudinal direction perpendicular to the two side walls. In this way the rolls 36 allow one or more storage containers 106 to be shifted into or off the container carrier 35 while being guided by the side walls. The conveyor may be connected to a conveyor motor allowing rotation of one or more of the rolls.

Perspective views of an automated storage and retrieval system is shown in FIG. 4A-B. The system comprises a storage grid 104 and a delivery system 140 comprising a delivery rail system 50, a plurality of delivery vehicles 30 operating on the delivery rail system 50.

The storage grid 104 is equal or similar to the prior art storage grid 104 as described above, i.e. a storage grid 104 comprising a rail system 108; a plurality of stacks 107 of storage containers 106, a plurality of container handling vehicles 300 for lifting and moving storage containers 106 stacked in the stacks 107 and a delivery column 119, 120 configured to receive a storage container 106 from a container handling vehicle 300.

The delivery system 140 comprises one or more of the delivery vehicles 30 as described above, i.e. delivery vehicles 30 configured to receive and support storage container 106 for transport between one or more delivery columns 119,120 and one or more container handling stations 60 located outside the storage grid 104. The container handling station 60 may be located any predetermined position suitable for handling containers.

The delivery system 140 may further comprise a delivery rail system 50 situated below a delivery port 150 of the one or more delivery columns 119, 120.

As shown in FIG. 4A-B, the delivery rail system 50 may be constructed in the same way or a similar way as the rail system 108 for the container handling vehicles 200, 300. The delivery rail 50 extends at least from the delivery port 150 of one or more delivery columns 119, 120, and to the at least one container accessing station 60, such that each storage container 106 can be lifted into the container accessing station 60 where items held in the storage container 106 may be accessed from a different level than that of the delivery rail (see FIG. 6A-C).

Figure 5:
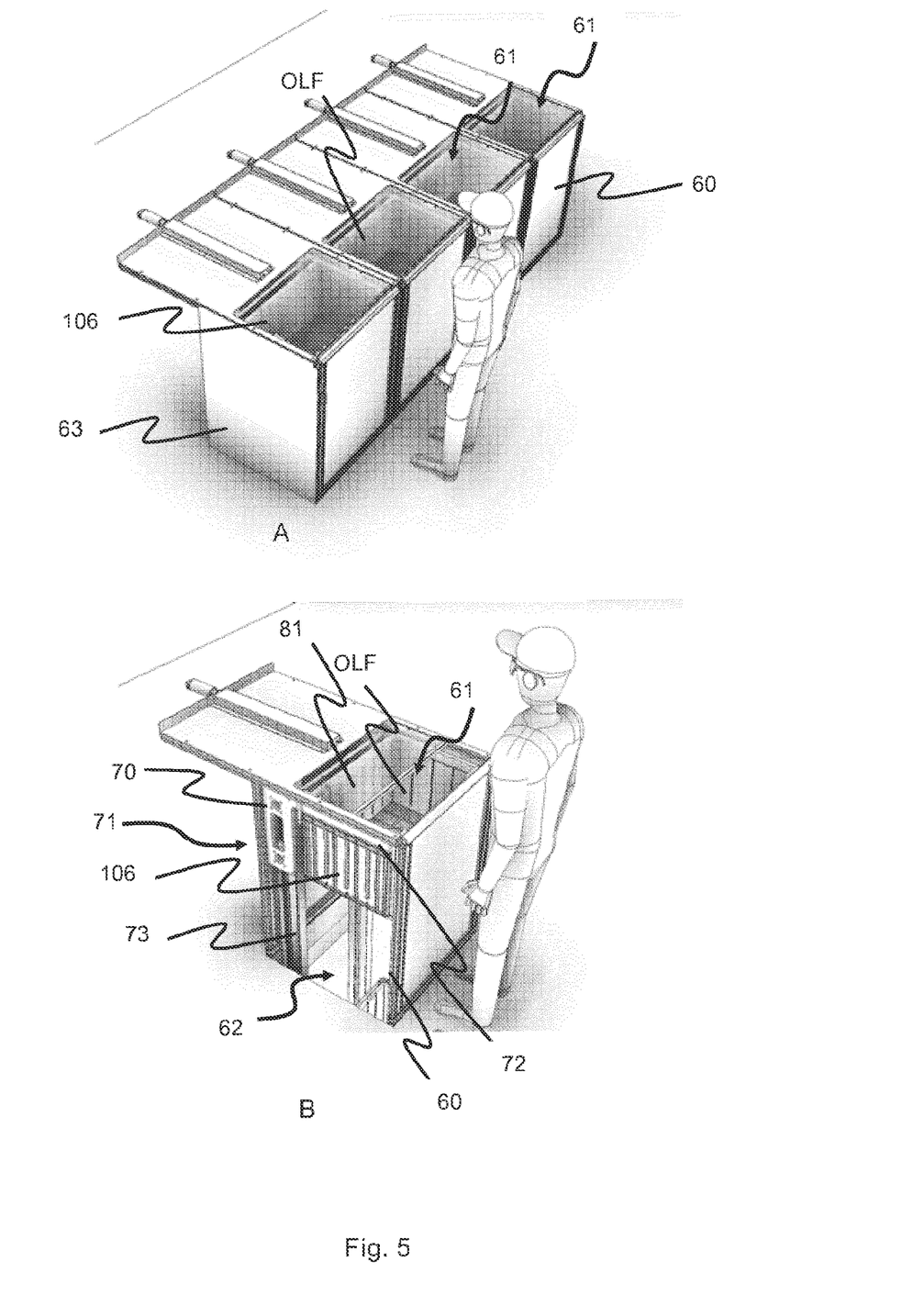

The container accessing station 60 may comprise a cabinet 63 comprising walls and a top cover supported thereon, as shown in FIG. 5A-B. The items held in the storage containers 106 carried by the delivery vehicle 30 and lifted to the container accessing station 60 is reachable trough an access opening 61 in the top cover of the cabinet 63.

The cabinet 60 is arranged adjoining the storage grid 104, where the delivery rail system 50 extends from below the delivery ports 150 and to a position located on a first level below a container accessing station 60.

The container accessing station 60 comprises an access opening 61 through which a human and/or robot may access contents of the container 106. The container accessing station 60 further comprises a base opening 62 provided at a lower part of the cabinet, and a lifting device 70 arranged to retrieve the container 106 from a first level beneath the base opening 62 and lift it up through the base opening 62 to a second level so that the container 106 may be accessed through the access opening 61.

As shown in FIG. 5B, the container accessing station 60 may comprise a deployable cover 81 for restricting access through the access opening 61. The deployable cover 81 may be a retractable cover 81. The cover may be arranged to open only if predetermined conditions are satisfied (e.g. if access to a container is authorised) and may thereby permit access to a container 106 through the access opening 61 when the container 106 is at the second level. The cover 81 may be transparent and may allow the contents of a container 106 to be viewed from outside the container accessing station 60.

Figure 6:
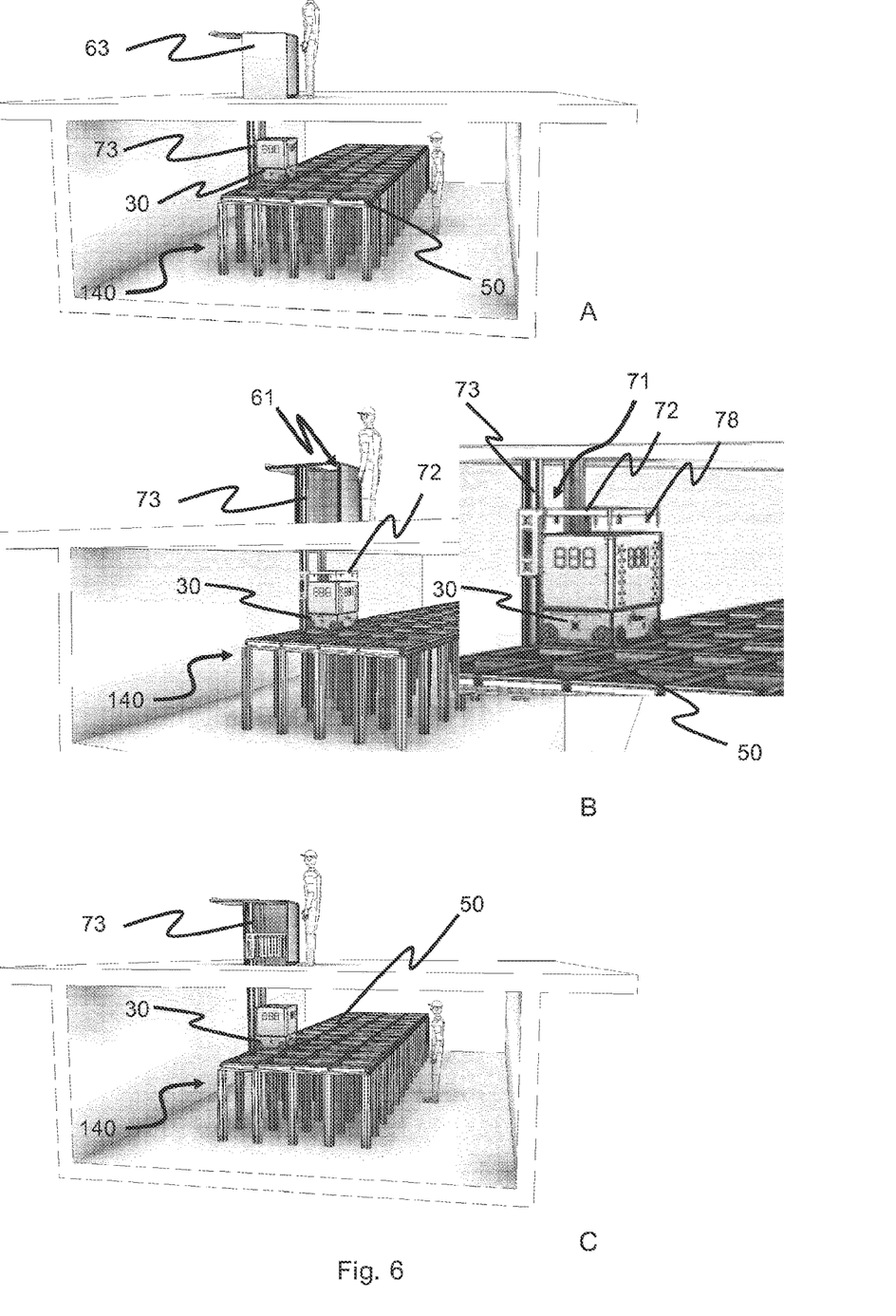
FIG. 6A-C is a perspective view of a set of the container accessing system comprising a delivery system and a container accessing station with a container lifting device.

FIG. 6A-C shows a container accessing system comprising a container accessing station 60 and a delivery system 140. The delivery system 140 in connected to a storage grid (see FIG. 4A-B) such that storage containers 106 may be retrieved form the storage location in the storage grid 104 and transported on delivery vehicles 30 to the delivery grid cell located vertically below a container accessing station 60. A lifting device 70 of the container accessing station 60 is operated to retrieve the storage container 106 and lifts it up from a first level to a second level where items stored in the storage container 106 may be accessed through the access opening 61 provided in the container accessing station 60.

The delivery system 140 in FIG. 6A-C may also be a storage grid (not shown). Such that the vehicle operating on the rails are container handling vehicles 200, 300. The container handling vehicles 200, 300 may retrieve a storage container 106 from the grid structure arranged below the rail system in which the container handing vehicles 200, 300 operates and deliver it to the lifting device 70 of the container accessing station 60. Thus, the lifting device 70 of the container accessing station 60 may retrieve a storage container 106 from a delivery vehicle 30 or a container handling vehicle 200, 300.

The lifting device 70 extends beneath the base opening 62 and comprises a lifting frame 72 for releasable connection to the container 106 and a lift mechanism 71 arranged to move the lifting frame 72 from the first level to the second level.

The lifting frame 72 comprises four corner sections, and gripper elements 78 for releasable connection to the storage container 60.

The lifting frame 72 provides an opening (OLF) in which an item stored in the storage container can be reached by the human and/or robotic operator at the container accessing station 60, through the opening (OLE) of the lifting frame 72 when the container 60 is lifted to the second level at the access opening 61.

The lift mechanism 71 may comprise a guiding structure 73 arranged vertically and at least between the first level and the second level, wherein the horizontal lifting frame 72 is moveable along at least a section of the guiding structure 73.

Figure 7:
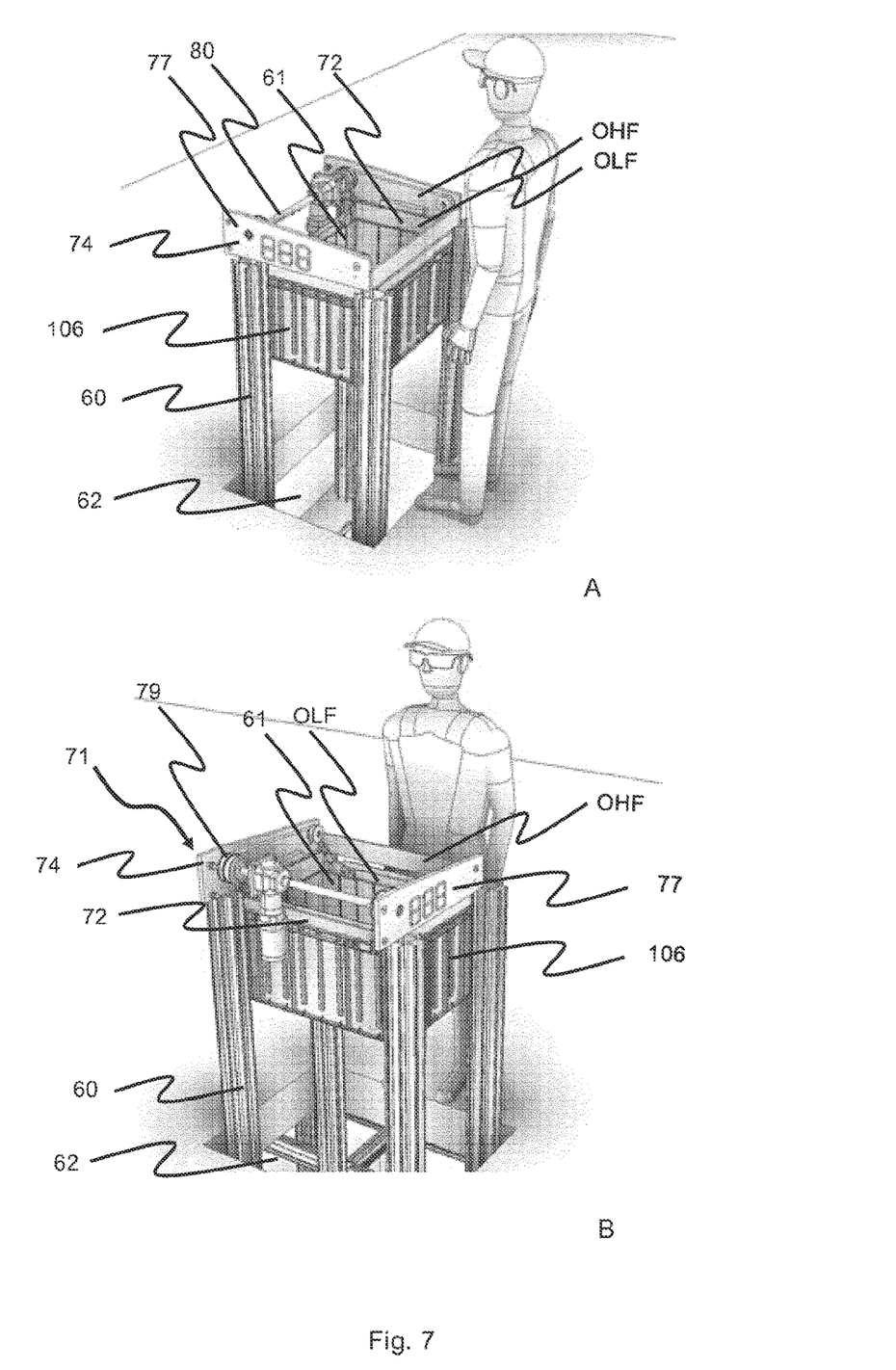
FIG. 7A-B shows a container accessing station according to an embodiment of the present invention comprising a lifting device with lifting bands.
Figure 8:
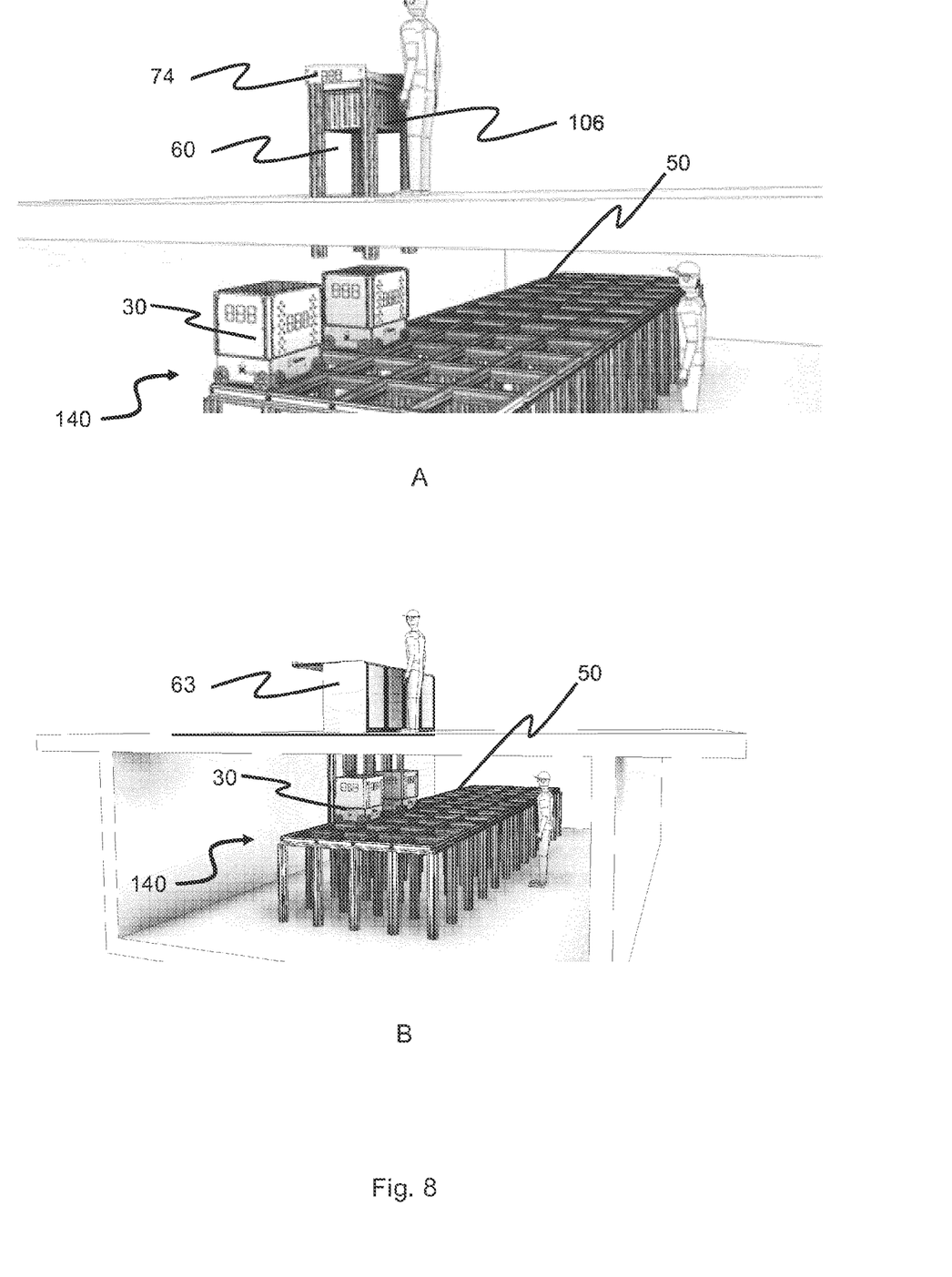
FIG. 8A-B shows the container accessing system according to an embodiment of the present invention.

FIG. 7A-B shows another embodiment of the lifting device 70 comprising a lifting frame 72 and a lift mechanism 71.

The lift mechanism 71 may comprise a hoist frame 74 with an opening (CHF) provided at the access opening 61 and defining an access perimeter and comprises a plurality of lifting bands guided by the hoist frame 74. The lifting frame 72 is suspended in a horizontal orientation from the hoist frame 74 by the plurality of lifting hands, wherein the access perimeter of the opening (OHF) in the hoist frame 74 corresponds in shape and alignment to the access perimeter of the opening (OLF) in the lifting frame 74 to allow access to items stored in the storage container through the respective openings (OHF, OLF) when the lifting frame 72 has been lifted up to the hoist frame 74 by the lift mechanism 71.

The hoist frame 74 may comprise a pair of arms 77 and wherein a sheave 79 is connected to a distal end of each arm 77.

The lift mechanism 71 may comprise a lifting shaft 80 for winding/unwinding the lifting bands simultaneously.

Accordingly, the container accessing station 60) may comprise a cabinet body 63 arranged about the access opening 61 and the base opening 62 such that a storage container 106 lifted into the cabinet body 63 by the lifting device 70 is only accessible through the access opening 61.

Reference Numerals:
20 Delivery vehicle
31 Vehicle body
32 Rolling device
32a First set of wheels
32b Second set of wheels
35 Container carrier
36 Rolls of conveyor
50 Delivery rail system
51 Delivery grid
52 Delivery grid cell
60 Container accessing station
61 Access opening
62 Base opening
63 Cabinet
P1 Horizontal plane of delivery rail system
70 Lifting device
71 Lift mechanism
72 Lifting frame
73 Guide structure
74 Hoist frame
75 Hoist mechanism
76 Lifting bands
77 Arm
78 Gripper elements
79 Sheave
80 Lifting shaft
81 Deployable cover
OLF Opening lifting frame
OHF Opening hoist frame
100 Framework structure
102 Upright members of framework structure
103 Horizontal members of framework structure
104 Storage grid/three-dimensional grid
105 Storage column
106 Storage container
107 Stack
108 Rail system
110 First set of parallel rails in first direction (X)
111 Second set of parallel rails in second direction (Y)
115 Grid opening
119 Delivery column
120 Delivery column
122 Grid cell
140 Delivery system
150 Delivery port
200 First container handling vehicle
201 Wheel arrangement
300 Second container handling vehicle
301 Wheel arrangement
X First direction
Y Second direction
P Horizontal plane of rail system

The invention claimed is:

1. An automated storage and retrieval system comprising:
an automated storage and retrieval grid (104) comprising:
a container handling vehicle rail system for guiding a plurality of container handling vehicles, the container handling vehicle rail system comprising a first set of parallel rails arranged in a horizontal plane (P) and extending in a first direction (X), and a second set of parallel rails arranged in the horizontal plane (P) and extending in a second direction (Y) which is orthogonal to the first direction (X), which first and second sets of rails form a grid pattern in the horizontal plane (P) comprising a plurality of adjacent container handling vehicle grid cells, each container handling vehicle grid cell comprising a container handling vehicle grid opening defined by a pair of neighboring rails of the first set of rails and a pair of neighboring rails of the second set of rails; and
a delivery column adapted for transport of a storage container arranged in a stack of storage containers beneath the container handling vehicle rail system between a container handling vehicle and a delivery port situated at a lower end of the delivery column,
a container accessing station,
a delivery rail system comprising at least a first set of parallel rails arranged in a horizontal plane (P1) and extending in a first direction (X), and at least a second set of parallel rails arranged in the horizontal plane (P1) and extending in a second direction (Y) which is orthogonal to the first direction (X), the first and second sets of rails together defining a delivery grid of delivery grid cells, and
a delivery vehicle operating on the delivery rail system and comprising a motorized vehicle body and a container carrier provided above the motorized vehicle body for carrying the storage container,
wherein the delivery vehicle is arranged to transport the storage container from the delivery port of the storage grid across the delivery grid to the delivery grid cell situated below the container accessing station,
the container accessing station comprising:
an access opening through which a human and/or robot may access contents of the storage container;
a base opening; and
a lifting device arranged to retrieve the storage container from a first level beneath the base opening and lift it up through the base opening to a second level so that the storage container may be accessed through the access opening,
wherein the delivery vehicle is arranged to deliver the storage container to the lifting device of the container accessing station, or receive a storage container from the lifting device and return the storage container to the delivery port for storage within the storage grid.

2. The container accessing station according to claim 1, wherein the lifting device extends beneath the base opening and comprises a lifting frame for releasable connection to the storage container and a lifting mechanism arranged to move the lifting frame from the first level to the second level.

3. The container accessing station according to claim 2, wherein the lifting frame comprises four corner sections, and gripper elements for releasable connection to the storage container.

4. The container accessing station according to claim 2, wherein the lifting frame provides an opening (OLE) through which an item stored in the storage container can be reached by the human and/or robotic operator at the container accessing station, through the access opening and the opening (OLE) of the lifting frame.

5. The container accessing station according to claim 4, wherein the lift mechanism comprises a hoist frame with an opening (UHF) provided at the access opening defining an access perimeter; and comprises a plurality of lifting bands guided by the hoist frame, and wherein the lifting frame is suspended in a horizontal orientation from the hoist frame by the plurality of lifting bands, wherein the access perimeter of the opening (OHF) in the hoist frame corresponds in shape and alignment to the access perimeter of the opening (OLF) in the lifting frame to allow access to items stored in the storage container through the respective openings (OHF, OLE) when the lifting frame has been lifted up to the hoist frame by the lift mechanism.

6. The container accessing station according to claim 5, wherein the hoist frame comprises a pair of arms and wherein a sheave is connected to a distal end of each arm.

7. The container accessing station according to claim 6, wherein the lift mechanism comprises a lifting shaft for winding/unwinding the lifting bands simultaneously.

8. The container accessing station according to claim 2, wherein the lift mechanism comprises a guiding structure arranged vertically and at least between the first level and the second level, wherein the lifting frame is moveable along at least a section of the guiding structure.

9. The container accessing station according to claim 1, comprising a cabinet body arranged about the access opening and the base opening such that a storage container lifted into the cabinet body by the lifting device is only accessible through the access opening.

10. The container accessing station according to claim 9, wherein container accessing station comprises a deployable cover for restricting access through the access opening.

11. The container accessing station according to claim 10, wherein the deployable cover is a retractable cover arranged to open only if predetermined conditions are satisfied and thereby permit access to the container through the access opening when the container is at the second level.

12. The container accessing system according to claim 1, wherein the container accessing station (60) is disposed on a floor above the grid.

13. The container accessing system according to claim 1, comprising a plurality of container accessing stations.

14. The system according to claim 1, wherein the delivery vehicle comprises:
   rolling devices connected to the vehicle body,
   a rolling device motor for driving the rolling device in the horizontal plane (P1), and
   a power source connected to the rolling device motor.

15. A method of accessing a storage container through a container accessing station, within a system comprising:
   an automated storage and retrieval grid (104) comprising:
      a container handling vehicle rail system for guiding a plurality of container handling vehicles, the container handling vehicle rail system comprising a first set of parallel rails arranged in a horizontal plane (P) and extending in a first direction (X), and a second set of parallel rails arranged in the horizontal plane (P) and extending in a second direction (Y) which is orthogonal to the first direction (X), which first and second sets of rails form a grid pattern in the horizontal plane (P) comprising a plurality of adjacent container handling vehicle grid cells, each container handling vehicle grid cell comprising a container handling vehicle grid opening defined by a pair of neighboring rails of the first set of rails and a pair of neighboring rails of the second set of rails; and
      a delivery column adapted for transport of a storage container arranged in a stack of storage containers beneath the container handling vehicle rail system between a container handling vehicle and a delivery port situated at a lower end of the delivery column,
   a container accessing station,
   a delivery rail system comprising at least a first set of parallel rails arranged in a horizontal plane (P1) and extending in a first direction (X), and at least a second set of parallel rails arranged in the horizontal plane (P1) and extending in a second direction (Y) which is orthogonal to the first direction (X), the first and second sets of rails together defining a delivery grid of delivery grid cells, and
   a deliver vehicle operating on the delivery rail system and comprising a motorized vehicle body and a container carrier provided above the motorized vehicle body for carrying the storage container,
   wherein the delivery vehicle is arranged to transport the storage container from the delivery port of the storage grid across the delivery grid to the delivery grid cell situated below the container accessing station,
   the container accessing station comprising:
      an access opening through which a human and/or robot may access contents of the storage container;
      a base opening; and
      a lifting device arranged to retrieve the storage container from a first level beneath the base opening and lift it up through the base opening to a second level so that the storage container may be accessed through the access opening,
   wherein the delivery vehicle is arranged to deliver the storage container to the lifting device of the container accessing station, or receive a storage container from the lifting device and return the storage container to the delivery port for storage within the storage grid,
   wherein the method comprises:
      retrieving the storage container from a first level using the lifting device and lifting it up through the base opening to a second level; and
      accessing the storage container at the second level through the access opening.

* * * * *